United States Patent

[11] 3,575,425

| [72] | Inventor | John L. Saksun |
| | | 27 Blair Athol Crescent, Islington, Ontario, Canada |
| [21] | Appl. No. | 763,323 |
| [22] | Filed | Sept. 27, 1968 |
| [45] | Patented | Apr. 20, 1971 |
| [32] | Priority | July 18, 1968 |
| [33] | | Canada |
| [31] | | 025,481 |

[54] CYLINDER END CAP
3 Claims, 6 Drawing Figs.

[52] U.S. Cl. ............................................. 277/58, 277/178, 277/235
[51] Int. Cl. ............................................. F16j 15/24, F16j 15/32
[50] Field of Search ............................................. 277/58, 178, 206

[56] References Cited

UNITED STATES PATENTS

| 2,992,027 | 7/1961 | Wright et al. | 277/58 |
| 3,179,427 | 4/1965 | Rizzo | 277/206X |
| 3,477,731 | 11/1969 | Workman | 277/58 |

FOREIGN PATENTS

| 554,093 | 6/1957 | Italy | 277/206 |
| 558,544 | 1/1944 | Great Britain | 277/206 |

*Primary Examiner*—Mark M. Newman
*Assistant Examiner*—Cort R. Flint
*Attorney*—Rogers, Bereskin & Parr

ABSTRACT: A cylinder end cap having a sleeve of tough, resilient urea-urethane, resistant to creep and set under load, molded therein. The sleeve provides a passage through which a piston rod passes, the passage having a seal and a wiper for the piston rod. The sleeve is, over its entire length, firmly bonded to the end cap to provide a durable seal without need for careful machining of the hole in which it fits.

Patented April 20, 1971

INVENTOR.
JOHN L. SAKSUN

BY Rogers, Bereskin, & Parr

Patented April 20, 1971

INVENTOR.
JOHN L. SAKSUN

BY Rogers, Bereskin, & Parr

CYLINDER END CAP

This invention relates to a cylinder end cap for use in hydraulic machinery. The cylinder end cap is also suitable for use (provided that it is not subjected to high temperatures) in other types of equipment, including pneumatic equipment.

In the past, cylinder end caps used in double-acting cylinders in hydraulic machinery have required special seals and packings to provide a sliding seal at the location where the piston rod extends through the end cap. These seals and packings have been complicated and expensive, particularly where high pressures are used and where little or no leakage can be tolerated, as for example in high accuracy automatic metal working equipment. In addition to the cost of the seal, the metal end plate itself has had to be bored and machined to close tolerances with resultant high labour costs.

A further problem in the past has been that prior art packings often caused substantial resistance to movement of the piston rod through them, increasing the power necessary to drive the piston.

Accordingly, it is an object of the present invention in one of its aspects to provide a cylinder end plate in which a sleeve containing a seal and a wiper for the piston rod is molded in place in a larger diameter hole in the end cap. Since the precise dimensions of the larger diameter hole in the end plate are not critical, this hole can be roughly bored, at much reduced cost. The molding operation is relatively simple and lends itself to mass production, and the molded sleeve, which is of a tough resilient material, resistant to set and creep under load, is firmly bonded to the metal of the cap to provide a durable seal which is operative under widely varying pressures, and which presents relatively low resistance to the piston rod.

Further objects and advantages of the invention will appear from the following description taken together with the accompanying drawings, in which.

Figure 1:
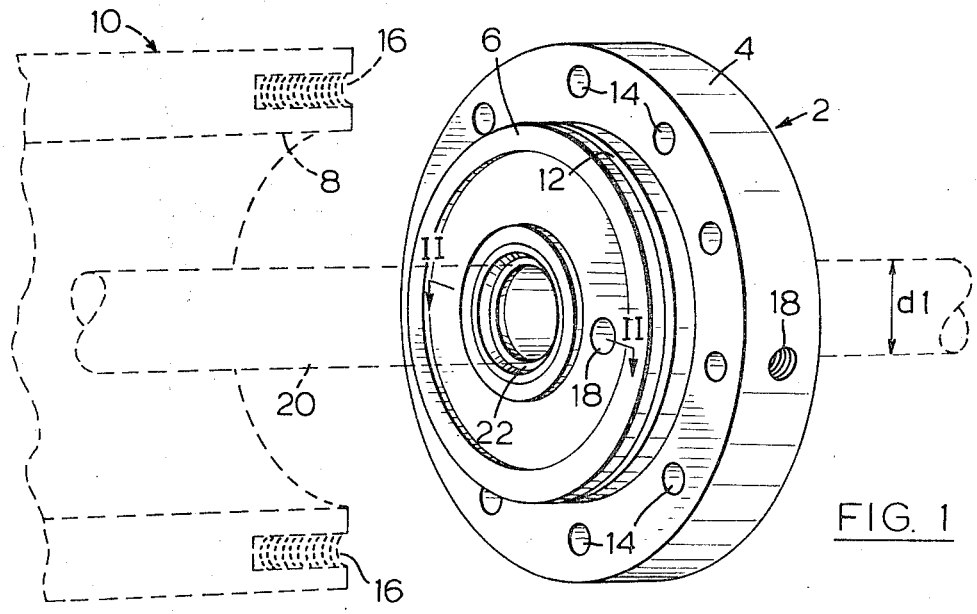
FIG. 1 is a perspective view of a cylinder end cap according to the invention, with portions of a cooperating piston rod and cylinder shown in dotted lines, the cylinder being in section.

Referring firstly, to FIG. 1, there is shown a cylinder end cap generally indicated at 2. The end cap includes a metal plate which in the embodiment shown includes an end plate portion 4 and a cylindrical projection 6 around which the walls 8 of a cylinder 10 fit. The projection 6 includes a circumferential groove 12 around its sidewall to accommodate a rubber O-ring or the like, to seal the end cap 2 to the cylinder 10. Holes 14 are provided around the periphery of the end plate 4 through which bolts or tie rods may be inserted into threaded apertures 16 in the ends of the cylinder 10, to fasten the cylinder end cap to the cylinder. The cylinder 10 is typically a double-acting cylinder containing oil or other hydraulic fluid, and accordingly the end cap 2 may include a port 18 extending from the side of the end plate 4 to the face of the cylindrical projection 6, to conduct oil from or into the cylinder.

The cylinder 10 contains a piston (not shown) having a piston rod 20 of diameter $d1$. The piston rod 20 extends from the cylinder through a sleeve 22 in the end cap. The sleeve 22 is of a tough, resilient material (typically a urea-urethane elastomer), resistant to creep and set under load, and is molded in and bonded firmly to the end cap.

Figure 2:
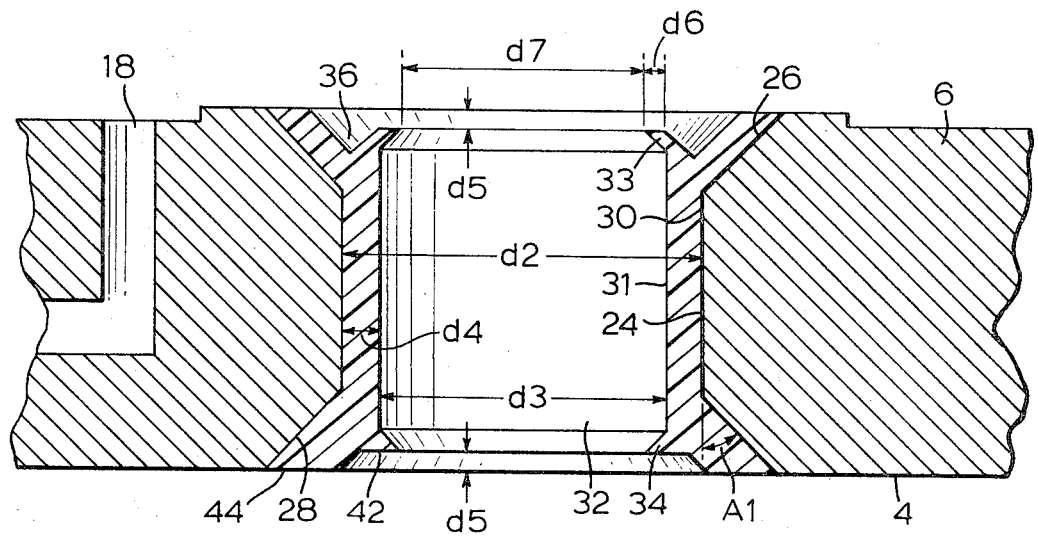
FIG. 2 is a section along lines II–II of FIG. 1 showing a portion of the cylinder end cap of FIG. 1.

The details of the configuration of the sleeve 22 are best shown in FIG. 2. FIG. 2 is not drawn to scale, instead the various parts of the sleeve are shown slightly exaggerated, for clarity of illustration. Typical dimensions for various parts of the sleeve are given assuming a 1-inch diameter piston rod.

As shown, the sleeve is located in an enlarged hole 24 in the end cap. The hole 24 has a middle portion of diameter $d2$ substantially larger than the diameter $d1$ of the piston rod and has first and second beveled ends 26, 28. The outwardly slanting or beveled edges 26, 28 are provided for additional resistance to the tendency of the pressurized oil in cylinder 10 to strip the sleeve 22 from the end cap. The angle $A1$ between the beveled edges and the axis of the end cap is typically between 20° and 45°.

The precise dimensions of the hole 24 and beveled ends are not critical since slight variations or inaccuracies will be taken up when the sleeve 22 is molded in place. The general dimensions of the hole 24 will depend on the dimensions desired for the sleeve 22, which will now be discussed.

The sleeve 22 includes an outer wall 30 bonded to the surface of hole 24, and an inner wall 31. The inner wall 31 defines, over the middle portion of the sleeve, a hole 32 of substantially uniform diameter $d3$. Diameter $d3$ is slightly greater than diameter $d1$ of the piston rod, so that the piston rod may be moved back and forth through the hole with a minimum of driving force. For a 1-inch diameter piston rod, diameter $d3$ of hole 32 is typically 1.008 to 1.002 inches.

The thickness of the sleeve 22, i.e., the distance $d4$ between its outer and inner walls 30, 31, can vary substantially. However, if the sleeve is made too thick, there will be more tendency for fluid pressure in the cylinder 10 to strip the sleeve from the end cap, while if the sleeve is made too thin, it will wear more rapidly. A typical thickness for dimension $d4$ is between 0.060 and 0.250 inches.

Adjacent its ends, the sleeve 22 contains a pair of inwardly directed circumferential lips 33, 34. Lip 33 is located in the cylindrical projection 6, i.e., at the end of the cylinder 10, and forms a seal for the piston rod 20. Lip 34 is located adjacent the outside surface of the cylinder end cap and forms a wiper for the piston rod. Both lips 33, 34 are recessed from the ends of the end cap 2 by a distance $d3$, to prevent damage to the lips. Distance $d5$ is typically 0.060 to 0.150 inches, and can be greater, but this would reduce the effectiveness of the lips 33, 34 as a bearing and guide for the piston rod.

The thickness $d6$ of the tip of the lip 33 is typically between about 0.045 and 0.085 inches. This lip extends inwardly to define an interior diameter $d7$ typically between 0.920 and 0.980 inches, to provide a good seal for the piston rod. The interior diameter of lip 34 is the same as that of lip 33.

Figure 3:
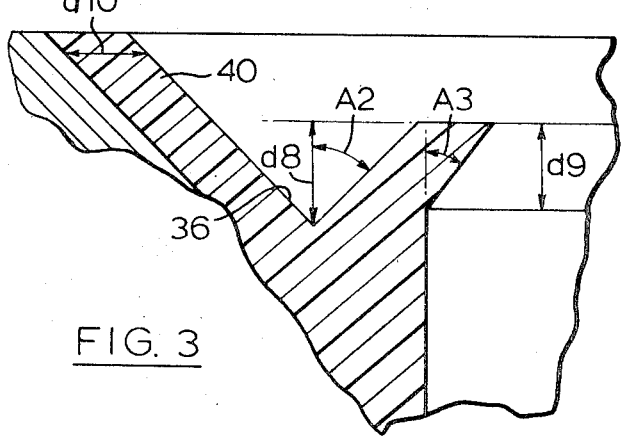
FIG. 3 is an enlarged section showing a sealing lip of the sleeve shown in FIG. 2.

Encircling lip 33 is a groove 36 extending axially into one end face of the sleeve 22. The root 38 of the groove 36 (see FIG. 3) is spaced a distance $d8$ from the end face of lip 33, the distance $d8$ being between 10 percent and 40 percent greater than the axial extent (indicated by dimension $d$) of lip 33. For example, distance $d9$ is typically about 0.020 to 0.050 inches, and distance $d8$ is a minimum of 10 percent greater. The reason for this is so that when the end cap is in place on a cylinder containing oil at high pressure, the oil will enter the groove 36 and force the lip 33 against the piston rod to provide a seal against oil leakage. The depth of the groove 36 below the lip improves the flexibility of the lip in providing a seal. For the same reason, the angle $A2$ (FIG. 3) between the outer surface of the lip 33 and the axis of the end cap is made slightly greater than angle $A3$ between the inner surface of the lip and the axis of the end cap, so that the root of the lip is thicker than its tip. Angle $A3$ is typically between 20° and 60°, and angle $A2$ is typically between 15° and 45°.

From the groove 36, the sleeve extends axially and outwardly to form an outer end lip 40, at the end surface of the cylinder end cap. The thickness $d10$ of the outer end lip 40 is not critical, but the thinner this lip is, the less end are of the sleeve will be exposed for oil in the cylinder to act on to strip the sleeve from the end cap. Dimension $d10$ may typically be about one-eighth inch.

The wiper lip 34 has the same interior diameter $d7$ as does sealing lip 33, and has the same axial extent, but it lacks the encircling groove 36. There is no need for a groove similar to groove 36 because there is no pressure fluid outside the end of the end cap 2 at which wiper lip 34 is located to push lip 34 against the piston rod.

From the end face 42 of wiper lip 34, the sleeve 22 slopes axially and outwardly to form a second outer end lip 44. The thickness of outer end lip 44 is not important, since there is no pressure fluid acting on it.

It is found in practice that the best material for the sleeve 22 is a urea-urethane elastomer. Typical urea-urethane elastomers utilized for the sleeve are formed by using commercially available prepolymers such as those known under the trade marks Adiprene L167 or L200 (Du Pont), Cyanaprene D5 or D6 (American Cyanamid), Formrez P610 or P611 (Witco Chemical Company), or Vibrathane 6006 or 6009 (Uniroyal Company) and reacting the chosen prepolymer with an aromatic amine of the type methylene-O-bis-chloraniline or dichloro benzidine at an amine equivalent ratio of 85 to 100 percent. The two main reactants are in liquid state and are physically mixed together at temperature ranging from 150° F. to 220° F. The addition of the amine to the prepolymer causes a reaction between the free isocyanate groups of the prepolymer and the amine groups of the aromatic amine, causing an additional reaction which produces both longer molecules (chain extension) and interaction (cross linking), thereby converting a liquid resin (prepolymer) into a solid elastic (urea-urethane) after a period of time which varies from 2 minutes to 20 minutes.

In order to achieve a strong enduring bond between the urethane material and the metal cylinder cap, the procedure is as follows:

The surface of the aperture 24 in the cylinder cap is first cleaned mechanically by subjection to a compressed air propelled blast of sand, glass beads, iron or steel grit, aluminum oxide or similar material whereby all surface dirt, scale, rust, etc. is removed, to provide a clean virgin metal surface. The cleaned surface is then further cleaned by dunking, washing or vapor cleaning with a suitable solvent such as trichloroethane to assure complete absence of any oil or grease. The cleaned metal surface is then given two coatings of a suitable chemical primer such as those sold under the trade marks Thixon XAB936 or 894 (Dayton Chemical Products Laboratories). The primer is of nature such that a chemical bond is established between the metal and the primer, and between the primer and the urethane.

After the two coats of the primer have been brushed or sprayed barrel-shaped the hole 24, the end plate is placed on an aluminum mold plate 46 (FIGS. 4, 5) having a circular depression 48 machined to fit the outer diameter of the end plate 4 of the end cap, to locate the end plate in position. At the center of the depression 48 there is provided a circular projection 50 of a shape to mold the outer end face 42 of wiper lip 34 and the outer end lip 44. At the center of the projection 50 is located a hole in which is press fitted a metal pin 52. A barrel-shaped piece 54 of outer diameter d3 and having beveled ends to form the sloping surfaces of the lips 33, 34 can be slipped over the pin 52, and a mold cap 56 is provided to fit over the pin 52 above the barrel-shaped piece 54, the cap 56 having a circular pointed projection 58 to complete the molding of the upper lip 33.

After the primed end cap 2 has been placed in the mold base plate, and before the barrel piece 54 is positioned on pin 52, the various mold parts are placed in a hot air oven for a length of time necessary to ensure (a) that all retained solvent is evaporated from the primer, and (b) that the complete assembly reaches a stabilized temperature suitable for casting of the urethane. This temperature is usually 212° F. within normal commercial tolerances.

After the parts have reached operating temperature, and after the prepolymer and amine have been combined (usually by mechanical stirring under a vacuum of at least 20 millimeters of mercury), the liquid material is poured into the space between the pin 52 and the hole 24 in the cylinder end cap. After the hole is filled, the barrel-shaped piece 54 is fitted over the pin 52 and pushed down the into the liquid until it hits mold plate 46. Member 54 is inserted at this time because, if it were inserted before pouring, the relatively thin gap between the outside of piece 54 and the hole 54 (typically about one-eighth inch) is so thin that it will not properly fill with urethane.

The assembly, with the mold plate 46, end cap 2, and barrel-shaped piece 54, with the liquid pour in place, is then left until the liquid sets to the consistency of relatively stiff cheese, which requires about 3 to 4 minutes. The mold cap 56 is then placed over the pin 52 and pressed down with a press. The assembly is left in the press for about 10 minutes and then placed in an oven for curing. After the assembly has been left for several hours to cure at 212° F., the mold parts can be removed from the end cap without damaging the lips 33, 34 of the urethane sleeve 22. The mold parts are treated in conventional manner to avoid adhering of the urethane to them.

The end cap with the sleeve in place is then allowed to mature for a period of at least a week (the sleeve 22 and its bond to the cylinder end cap will continue to mature for up to 30 days) before use.

Figure 6:
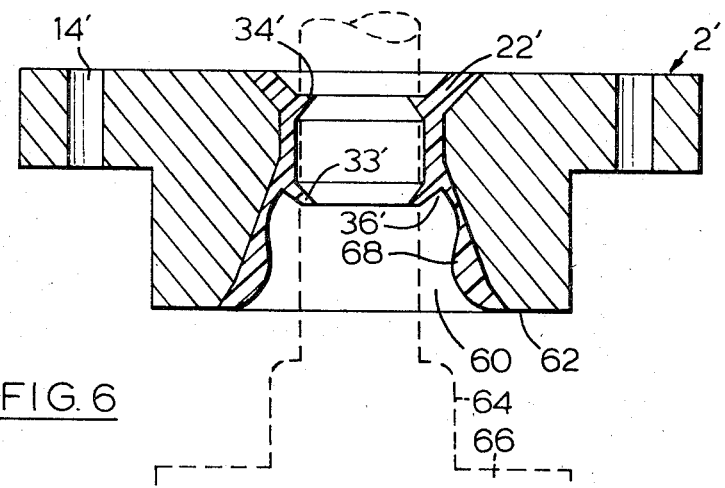
FIG. 6 is a section similar to FIG. 2 showing a modified cylinder end cap.

It will be realized that modifications may be made in the structure shown. For example, as shown in FIG. 6, where primed reference numerals indicate corresponding parts, the cylinder end cap may be a "cushion type" end cap, containing a bore 60 in its surface 62 positioned inside the cylinder 10'. The bore 60 is adapted to accommodate a projection 64 on the end of a piston 66, so that as the piston approaches the end of the cylinder, the projection 64 enters the bore 60 and tends to retard the movement of the piston, slowing the "run-in" of the piston. As shown, the sleeve 22' may be made with an end wall 68 to form the cushion of the cushion gap.

Generally, urethanes suitable for use in the present invention preferably have a hardness of between about 95 Shore A and 55 Shore D, elastic properties indicated by a Bashore Rebound value of 30 to 50 percent, resistance to compression set indicated by an A.S.T.M. Method B value of 25 to 35 percent, resistance to tearing indicated by A.S.T.M. Die C. value of about 500 pounds per inch or more, tensile strength at break of about 5,000 p.s.i., and elongation at break of about 400 percent or more.

The term "urea-urethane" refers to the order in which the reactions proceed to form the urethane. A urethane generally is formed by reacting a polyol, an isocyanate, and an amine. If the polyol and the amine react first, there will be too much cross linking and not enough chain extension, and the resulting product will not be sufficiently tough or oil resistant. If the polyol and isocyanate react first, adequate chain extension will occur, and this type of elastomer is known as a urea-urethane. The following are specific examples for production of urea-urethanes that may be used with the present invention.

EXAMPLE 1

A prepolymer, marketed under the trade mark Adiprene L–167 by E. I. Du Pont de Nemours & Company, made by reacting polytetramethylene ether glycol with toluene diisocyanate to a final active isocyanate content of 6.0 to 6.6 percent, is reacted with 44' methylene bis (2-chloraniline) in the following proportions:

|   | Parts by weight |
|---|---|
| Adiprene L–167 | 100 |
| 4,4' methylene bis (2 chloraniline) | 19.5 |

Cured in air for 3 hours at 212° F. followed by a room temperature maturation period of 3 to 7 days.
Hardness: 95 Shore A.

EXAMPLE 2

A prepolymer, marketed under the trade mark Multrathane F–66 by Mobay Chemical Company, made by reacting a polyester resin with a polyisocyanate to a final active isocyanate content of 6.3 to 6.7 percent, is reacted with trimethyol propane (an aromatic diol marketed under the trade mark Multrathane XA by Mobay Chemical Company) in the following proportions:

| | Parts by weight |
|---|---|
| Multrathane F-66 | 100 |
| Multrathane XA | 4.5 |
| 1,4-butanediol | 14.3 |

Cured for 3 hours in air at 212° F. followed by a room temperature maturation period of 3 to 7 days.
Hardness: 94 Shore A.

EXAMPLE 3

A prepolymer, marketed under the trade mark Formrez P-611 by Witco Chemical Company, made by reacting a polyester with a diisocyanate to a final active isocyanate content of 6.0 to 6.3 percent is reacted with 4, 4' methylene bis-(2-chloraniline), in the following proportions:

| | Parts by weight |
|---|---|
| Formrez P-611 | 100 |
| 4,4' methylene bis (2 chloraniline) | 17.5 |

Cured for 3 hours in air at 212° F. followed by a room temperature maturation period of 3 to 7 days.
Hardness: 55 Shore D.

EXAMPLE 4 a prepolymer, marketed under the trade mark Formrez P-610 by Witco Chemical Company, made by reacting a polyester with a diisocyanate to a final active isocyanate content of 6.0 to 6.3 percent, is reacted with 4, 4' methylene bis-(2-chloraniline), in the following proportions:

| | Parts by weight |
|---|---|
| Formrez P-610 | 100 |
| 4,4' methylene bis (2 chloraniline) | 18 |

Cured for 3 hours in air at 212° F. followed by a room temperature maturation period of 3 to 7 days.
Hardness: 55 Shore D.

EXAMPLE 5 a prepolymer, marketed under the trade mark Vibrathane 6009 by Uniroyal Chemicals, made by reacting a polyester with a diisocyanate to a final active isocyanate content of 5.4 to 5.8 percent, is reacted with 4, 4' methylene bis-(2-chloraniline), in the following proportions:

| | Parts by weight |
|---|---|
| Vibrathane 6009 | 100 |
| 4,4' methylene bis (2 chloraniline) | 16 |

Cured for 3 hours in air at 212° F. followed by a room temperature maturation period of 3 to 7 days.
Hardness: 45 Shore D.

EXAMPLE 6

A prepolymer, marketed under the trade mark Solithane ZL-650 by Thiokol Corporation, made by reacting a polyester with a diisocyanate to a final active isocyanate content of 5.5 to 5.9 percent is reacted with 4, 4' methylene bis-(2-chloraniline), in the following proportions:

| | Parts by weight |
|---|---|
| Solithane ZL650 | 100 |
| 4,4' methylene bis (2 chloraniline) | 17.4 |

Cured for 3 hours in air at 212° F. followed by a room temperature maturation period of 3 to 7 days.
Hardness: 50 Shore D.

Figure 4:
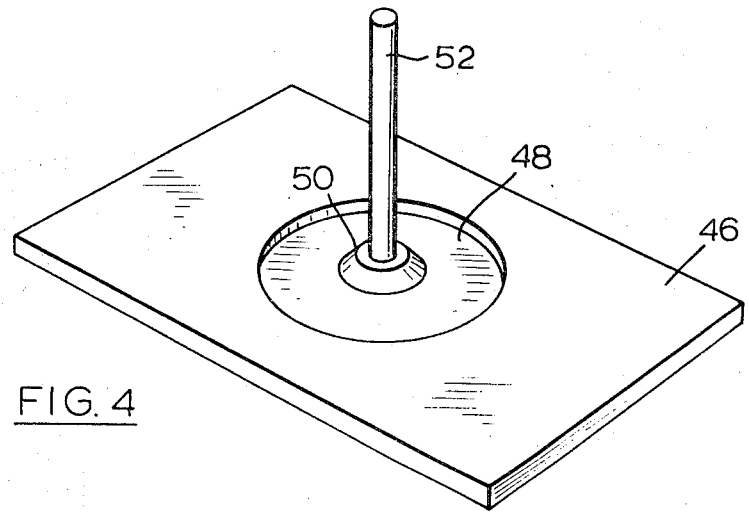
FIG. 4 is a perspective view showing a mold plate and pin for molding the sleeve of FIG. 2.
Figure 5:
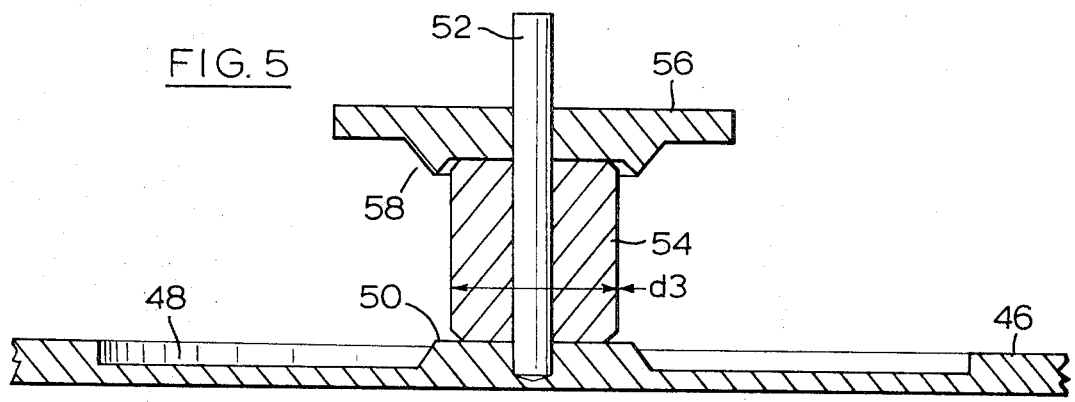
FIG. 5 is a section showing the assembled mold parts used for molding the FIG. 2 sleeve.

It will be appreciated that in some instance, where only one end cap is needed, it may not be economical to produce a mold such as that shown in FIGS. 4 and 5. In such case, a block or body of urethane can be molded in place in the hole 24 in the end cap, with or without a narrow central axial aperture of diameter smaller than that of the piston rod. An aperture of the required diameter, with a wiper and seal, can then be machined in the urethane block using conventional techniques. This has the advantage that it still provides a yieldable cushion seal which presents relatively low resistance to the piston rod, and machining urethane is of course less costly than machining steel.

Although the end cap has been described as for use with a double acting piston and cylinder, it can be used in any cylinder where there is a need for an end cap to seal the end and through which a piston rod must project.

I claim:

1. A cylinder end cap comprising:
   a. a one-piece metal end plate adapted to form the end of a cylinder, said end plate having first and second opposed surfaces and having a hole therein extending between said surfaces for a piston rod of specified diameter, said hole having a central portion of diameter larger than said specified diameter and being substantially enlarged at each end, each end of said hole being defined by a steeply outwardly sloping beveled edge surface,
   b. a sleeve of a urea-urethane elastomer that is resilient, tough and resistant to creep and set under load, said sleeve being molded in place in said hole and extending between said first and second surfaces and thus overlying said beveled edge surfaces, said sleeve having an outer surface bonded over substantially its entire length to said end plate, the adhesion of said sleeve to both said edge surfaces reducing the likelihood of said sleeve being stripped from said end plate,
   c. said sleeve having an interior aperture for said piston rod, said interior aperture being, over its middle portion, of diameter slightly greater than that of said piston rod,
   d. said sleeve including adjacent one end thereof a first lip extending slightly into said interior aperture to form a wiper and including adjacent its other end a second lip extending slightly into said interior aperture to form a seal and bearing for said piston rod, said lips defining interior openings of diameter slightly less than that of said piston rod,
   e. said urea-urethane elastomer having a Bashore rebound elasticity of between about 30 percent and 50 percent, a hardness of between about 95 Shore A and 55 Shore D, an A.S.T.M. Die C resistance to tearing value of at least 500 pounds per inch, and an elongation at break of at least 400 percent,
   f. said end plate including means for connecting said end plate to said cylinder.

2. A cylinder end cap according to claim 1 wherein said sealing and wiping lips include end faces inset from the ends of said end plate.

3. A cylinder end cap according to claim 2 wherein the end of face of said sleeve at its end adjacent said sealing lip is axially recessed at a position radially outwardly of and encircling said sealing lip, to form a circumferential groove extending axially past said first lip in a direction toward the end of said sleeve containing said wiper lip, to improve the radial compressibility of said sealing lip.